(12) United States Patent
Hagelin et al.

(10) Patent No.: US 6,419,185 B1
(45) Date of Patent: Jul. 16, 2002

(54) METHOD AND ARRANGEMENT FOR NAVIGATING A ROBOT TOWARDS A MOVING TARGET

(75) Inventors: Hans-Ove Hagelin; Erik Skarman, both of Linköping (SE)

(73) Assignee: Saab Dynamics AB, Linkoping (SE)

(*) Notice: Subject to any disclaimer, the term of this patent is extended or adjusted under 35 U.S.C. 154(b) by 0 days.

(21) Appl. No.: 09/601,115
(22) PCT Filed: Jan. 20, 1999
(86) PCT No.: PCT/SE99/00073
§ 371 (c)(1), (2), (4) Date: Sep. 29, 2000
(87) PCT Pub. No.: WO99/39150
PCT Pub. Date: Aug. 5, 1999

(30) Foreign Application Priority Data

Jan. 28, 1998 (SE) .............................. 9800222

(51) Int. Cl.[7] .............................................. F41G 7/22
(52) U.S. Cl. ........................ 244/3.15; 244/3.1; 244/3.24
(58) Field of Search .............................. 244/76 R, 3.15, 244/3.1, 3.11, 3.14, 3.16–3.19, 3.13, 3.24–3.29; 701/1, 23, 24, 27, 302

(56) References Cited

U.S. PATENT DOCUMENTS 5,050,818 A * 9/1991 Sundermeyer ............ 244/3.15
5,071,087 A * 12/1991 Gray ..................... 244/3.15
5,082,200 A   1/1992 Gray ..................... 244/3.15
5,828,571 A * 10/1998 Bessacini et al. ......... 244/3.15
5,987,362 A * 11/1999 Bessacini et al. ......... 244/3.15
6,006,145 A * 12/1999 Bessacini .............. 244/3.15
6,209,820 B1 * 4/2001 Golan et al. ............ 244/3.15

FOREIGN PATENT DOCUMENTS

DE          2 279 444 A    1/1995 ............ F41G/7/22

* cited by examiner

Primary Examiner—Galen L. Barefoot
(74) Attorney, Agent, or Firm—Connolly Bove Lodge & Hutz, LLP

(57) ABSTRACT

An arrangement in a missile and a method for guiding the missile towards a moving target, for example, an aircraft, wherein the missile has information on its own position, velocity vector, and future velocity characteristic. The missile continuously receives information on the position and velocity vector of the target. The arrangement and method operate such that, a point of interception, at which the missile is expected to strike the target, is calculated from the information on the missile and the target, and a velocity vector of the missile is directed towards the predicted point of interception, which is continuously predicted on the basis of an assumption as to the future movement of the target, and a calculation of the time to impact.

19 Claims, 2 Drawing Sheets

METHOD AND ARRANGEMENT FOR NAVIGATING A ROBOT TOWARDS A MOVING TARGET

The present invention relates to a method of guiding a missile towards a moving target and also relates to an arrangement in a missile for guiding the missile towards a moving target.

Several earlier methods of guiding a missile towards a moving target already exist. A central principle is that the missile has access to information on the position and velocity vector of the target and manoeuvres which lead towards a collision point, the missile velocity vector at all times pointing ahead of the target. In proportional navigation it is assumed that the target is all the time moving in the same direction and at a constant speed, the information being used so that rotation of the line of sight becomes zero; the missile manoeuvres 3–4 times faster than the rotation of the line of sight between the missile and the target. This guidance can be modified. For example, account can be taken of measured target acceleration across the line of sight.

GB, 2 279 444,A shows a system for guiding missiles. The system is intended to guide the missile along a straight trajectory when it is nearing its target, consequently preventing the missile from being exposed to excessively high g-forces. The system comprises means of tracking the target and continuously predicting its ballistic trajectory and tangents thereto. The future behaviour of the target is predicted by using the current condition and a mathematical model of the state of the atmosphere and the gravitation. The system furthermore has means of continuously determining the relative position, speed and acceleration of the missile and the target, and means of calculating an interception time therefrom. In addition the system has means of guidance for guiding the missile on to and along a tangent to the predicted ballistic trajectory ahead of the target corresponding to the interception time.

An object of the present invention is to eliminate or at least reduce the limitations that are associated with earlier known systems outlined above, due to the use, if any, of a highly simplified assumption as to the movement of the target.

Preferred methods and embodiments have any or some of the characteristics specified in the subordinate claims for each respective claim category.

The method and the arrangement according to the invention have various advantages. One important advantage is that the method and the arrangement according to the invention are designed for guiding towards manoeuvrable targets, the further movement of which is unpredictable and which in many applications have an objective of their own, opposed to that of the missile, namely to avoid being hit. The method and the arrangement according to the invention can cope with this guidance towards manoeuvrable targets in that, instead of homing at a tangent (lead point guidance) the missile homes in towards the predicted point of interception, which is calculated on the basis of a speculation as to what manoeuvres the target can be expected to perform up to the time of impact. Any knowledge of the type of target can contribute to a prediction of the target behaviour and hence to an estimation of the point of interception.

Another advantage is that improved kinematic performance is obtained due to the lesser resistance induced. This is explained by the fact that the missile velocity vector varies at a slower rate and is not directly affected by changes in the trajectory of the target.

A further advantage is that the missile manages to hit the target within a greater area of coincidence despite more complicated target behaviour than is feasible with previously known methods of missile guidance.

The present invention will be described in more detail below with reference to the drawing, which shows an example of an advantageous embodiment.

Figure 1:
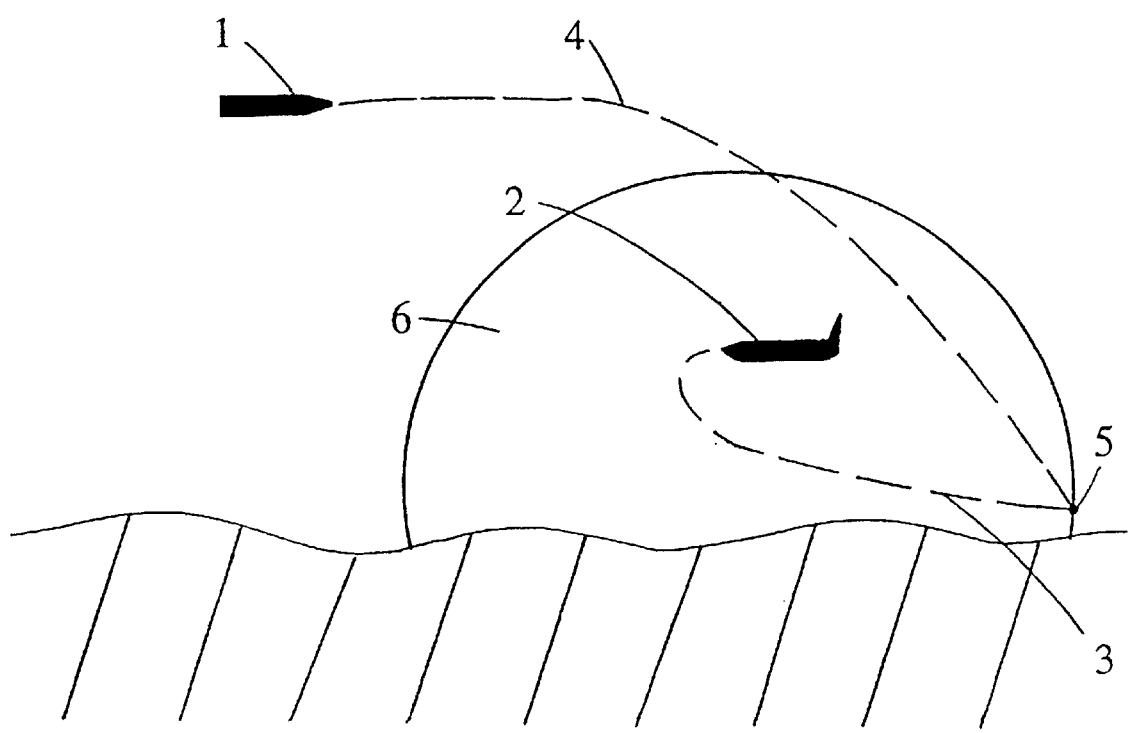
FIG. 1 shows the movements of a missile and a target over a period of time

In FIG. 1, 1 denotes a missile and 2 denotes a moving target in the form of an aircraft, which the missile is intended to hit. The reference number 3 denotes an example of the target trajectory and 4 an example of the missile trajectory over a period up to the time that the missile strikes the target at a point of interception 5. The reference number 6 denotes the area within which the target can be assumed to be during the period up to impact, estimated in the initial position.

Figure 2:
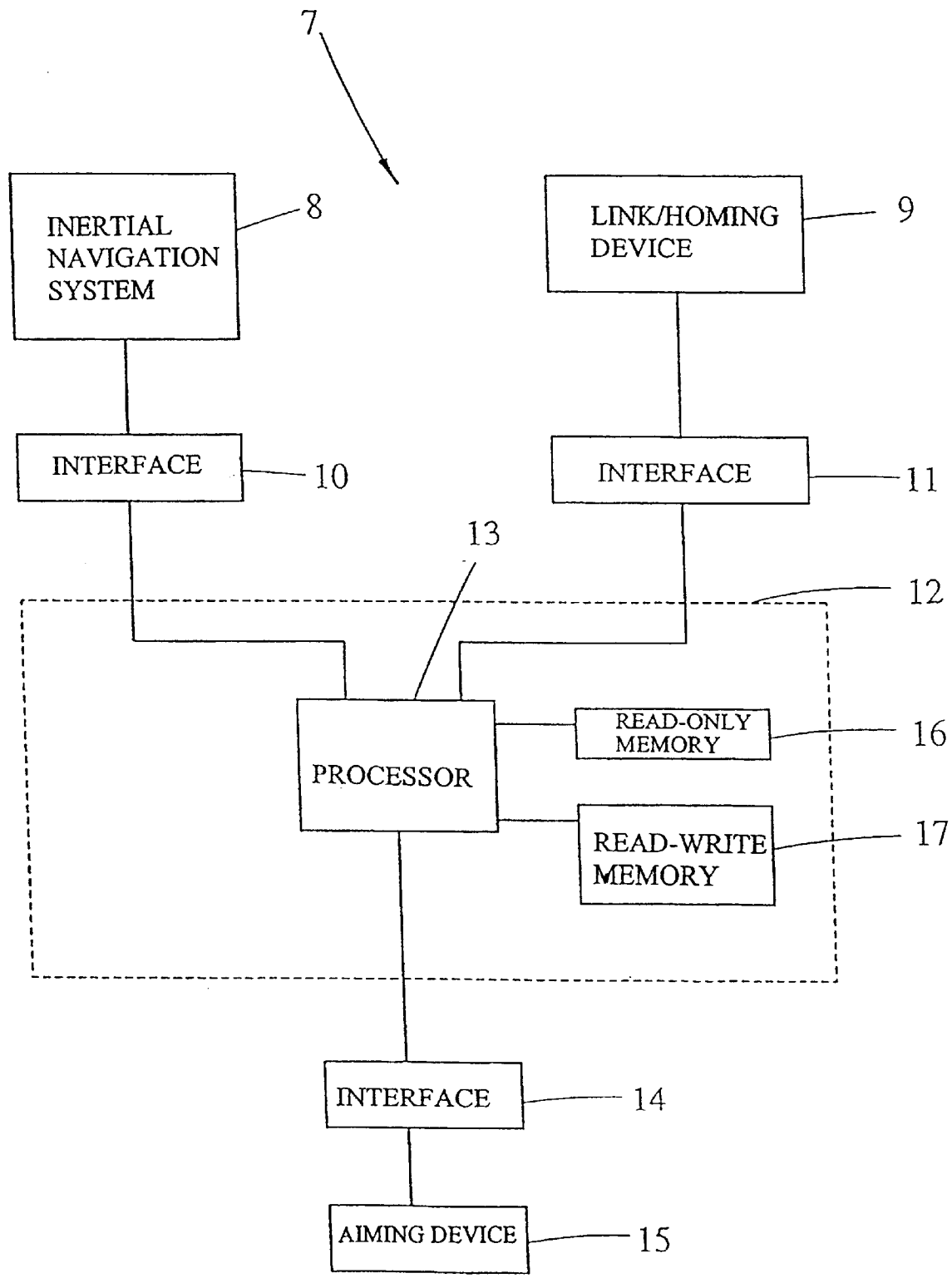
FIG. 2 shows an example of an arrangement according to the invention.

In FIG. 2, 7 denotes an arrangement in the missile 1. The arrangement 7 comprises an inertial navigation system 8 by means of which the missile 1 receives information on its own position and velocity vector. The missile furthermore receives information on the velocity characteristic during the continuous flight of the missile 1 from a missile computer (not shown). The inertial navigation system may be of a type that is currently in use. In another example (not shown) information on the missile is obtained through an arrangement of any type that can supply the said information.

The arrangement 7 also has an aircraft-missile communications link and missile homing device 9 for continuously supplying information on the position and velocity vector of the target 2. The missile homing device may be a radar sensor, for example, or an IR sensor and has a relatively short range, for which reason it can only be used in final phase guidance. When the missile is in the trajectory phase, it instead receives information on the target 2 via the aircraft-missile communications link, where the aircraft, for example, is the firing aircraft. The said aircraft has a long-range radar and can therefore also supply information on the target during trajectory phase guidance.

The arrangement 7 furthermore has interfaces 10 and 11 via which information from the inertial navigation system 8 and the missile computer and the aircraft-missile link/missile homing device 9 respectively can be read by means of a processor 13 into read-write memory 17 in a computer 12. In the computer 12 there is also a read-only memory 16, in which is stored a computer program with a set of instructions to the processor 13, which is designed to execute the instructions. The instructions are formulated so that, from the information on the missile 1 and the target 2 in the read-write memory 17, they can enable the processor 13 to predict a point of interception at which the trajectories of the missile 1 and the target 2 are simultaneously calculated to intersect and the missile is consequently expected to hit the target. The arrangement 7 furthermore has an interface 14, via which the point of interception calculated in the computer program is converted into a form that an aiming device 15, connected to the interface 14, can utilise in order to direct the missile velocity vector towards the said predicted point of interception.

The information from the inertial navigation system 8 and the aircraft-missile link/homing device 9 is continuously updated as the missile and the target move. The computer program can continuously update the predicted point of interception by repeating the instructions to the processor 13. As the point of interception is updated, so is the information to the aiming device 15, in order to guide the missile towards the predicted point of interception.

In predicting the point of interception use is made, on the one hand, of an assumption regarding future behaviour of the target in order to estimate the trajectory of the target, and on the other of a calculation of the time to impact (ttg) in order to estimate where along the trajectory of the target the missile is calculated to strike on the basis of the missile's information on its own position, velocity and further velocity characteristic, based on the predicted point of interception. The assumption regarding the future behaviour of the target, prediction of the point of interception and calculation of the time to impact (ttg) are continuously updated on the missile trajectory.

For example, the assumption as to the future behaviour of the target is based on the premise that the target travels along the trajectory that makes it hardest for the missile to hit. Therefore the missile will ordinarily strike after a longer period of time than with the use of previously known methods of missile guidance. On the other hand the missile's area of coincidence increases. This is most clearly apparent where the target is manoeuvred so that it moves in some way other than straight ahead or with a specific radius of curvature. If the type of target is known or can be identified, the assumption as to the future behaviour of the target should be based on this. For example, the space for manoeuvres that a transport plane can be expected to perform may be significantly less than what a fighter aircraft can be expected to perform.

When an assumption is made on future behaviour of the target, that is to say when the trajectory in which the target is assumed to continue has been determined, the point of interception is predicted on the basis of this assumption of the future target behaviour. The prediction is made by an iterative process in order to find a point along the trajectory of the target, which the target and the missile can reach simultaneously, that is to say a point at which the target time to impact $ttg_{target}$ coincides with the missile time to impact $ttg_{missile}$.

A starting value $ttg_{target, start}$ is first assigned to $ttg_{target}$, following which it is calculated at what point along its trajectory the target will be at this point in time. The starting value $ttg_{target, start}$ may, for example, be stored beforehand in the read-only memory 16. It is then calculated what length of time the missile would need in order to reach the same point. We then call this time $ttg_{missile, start}$. If $ttg_{target, start}$ and $ttg_{missile, start}$ do not coincide, a new value is calculated for $ttg_{target}$, which we then call $ttg_{target, start+1}$. For example, $ttg_{target, start+1}$ is calculated as the mean value of $ttg_{target, start}$ and $ttg_{missile, start}$. The process above is then repeated n number of times until $ttg_{target, start+n}$ and $ttg_{missile, start+n}$ coincide or are sufficiently close to one another. We then have a value for the time to impact ttg (i.e. $ttg=ttg_{target}=ttg_{missile}$) and the point at which the target and the missile are calculated to be at this time is the predicted point of interception.

As stated previously, the system here described is applicable in trajectory phase guidance and partially in final phase guidance.

What is claimed is:

1. A method for guiding a missile to intercept a moving airborne target, comprising:

providing information on a position, a velocity vector, and a future velocity characteristic of the missile to a processor in the missile;

receiving information on a target position and a target velocity vector of the airborne target and providing the received information to the processor;

predicting, in the processor, an intercept point of the missile and the airborne target using the information provided and the information received; and guiding the missile to the predicted intercept point, wherein said predicting an intercept point includes estimating a trajectory of the airborne target, wherein said estimating the trajectory includes assuming that the airborne target is maneuvered with an intention to avoid being hit by the missile, wherein said predicting the intercept point includes continuously updating a calculation of a point along an estimated trajectory of the airborne target which is reachable by the missile at a coinciding time.

2. The method of claim 1, further comprising receiving information regarding a type of airborne target, wherein said making an assumption of the future behavior of the airborne target is based on the type of airborne target.

3. The method of claim 1, wherein said making an assumption of a future behavior of the airborne target is based on an assumed worst-case target maneuver.

4. The method of claim 1, wherein said predicting an intercept point includes calculating a point at which a trajectory of the missile and a trajectory of the airborne target are expected to intersect.

5. The method of claim 1, wherein said receiving information on a target position and a target velocity vector of the airborne target includes receiving target information via a communications link.

6. The method of claim 5, wherein said receiving information includes continuously receiving information on a target position and a target velocity vector of the airborne target.

7. The method of claim 5, wherein said receiving information includes receiving information from an aircraft.

8. The method of claim 7, wherein said receiving information from an aircraft includes receiving information from a missile launching aircraft.

9. The method of claim 8, herein said receiving information from a missile launching aircraft is accomplished during a trajectory phase of the missile.

10. The method of claim 1, wherein said predicting an intercept point of the missile and the airborne target includes iteratively updating the predicted intercept point.

11. The method of claim 1, wherein said predicting an intercept point of the missile and the airborne target includes calculating a time-to-impact for each of the missile and the airborne target.

12. The method of claim 1, wherein said future velocity characteristic of the missile includes a missile acceleration.

13. A missile guidance system for guiding a missile to intercept an airborne target, comprising:

means for determining a missile state;

means for receiving information concerning a target state;

means for predicting an intercept point using the missile state, the target state, and an assumed target maneuver characteristic; and an aiming device operatively connected to said means for predicting the intercept point, wherein said aiming device is operatively connected to guide the missile to the predicted intercept point, wherein said means for predicting the intercept point estimates a trajectory of the airborne target at least based upon an assumption that the airborne target will be maneuvered with an intention of avoiding being hit by the missile, wherein the intercept point is continuously recalculated and updated over time as a point along an estimated trajectory which is reachable by the missile at a coinciding time.

14. The missile guidance system of claim 13, wherein said means for determining a missile state includes an inertial navigation system.

15. The missile guidance system of claim 13, wherein said means for receiving information concerning a target state includes a communication link.

16. The missile guidance system of claim 13, wherein said missile state includes a position, a velocity vector, and a future velocity characteristic of the missile.

17. The missile guidance system of claim 13, wherein said future velocity characteristic of the missile includes a missile acceleration.

18. The missile guidance system of claim 13, wherein said target state includes a target position and a target velocity vector.

19. The missile guidance system of claim 13, wherein said means for predicting an intercept point using the missile state, the target state, and an assumed target maneuver characteristic includes a processor operatively connected to an inertial navigation system and a communication link.

* * * * *